US009721571B2

(12) United States Patent
Lousky et al.

(10) Patent No.: US 9,721,571 B2
(45) Date of Patent: Aug. 1, 2017

(54) SYSTEM AND METHOD FOR VOICE PRINT GENERATION

(71) Applicant: NICE-SYSTEMS LTD., Ra'anana (IL)

(72) Inventors: Avraham Lousky, Hod Hasharon (IL); Jade Tarni Kahn, Givat Shmuel (IL); Tamar Sharir Beiser, Tel Aviv (IL); Amnon Buzaglo, Karkur (IL); Oren Yaakov Lewkowicz, Shoham (IL); Moshe Max Samet, Kfar Saba (IL)

(73) Assignee: NICE LTD., Ra'anana (IL)

( * ) Notice: Subject to any disclaimer, the term of this patent is extended or adjusted under 35 U.S.C. 154(b) by 67 days.

(21) Appl. No.: 14/738,891

(22) Filed: Jun. 14, 2015

(65) Prior Publication Data

US 2016/0365095 A1 Dec. 15, 2016

(51) Int. Cl.
*G10L 15/00* (2013.01)
*G10L 15/06* (2013.01)
*G10L 17/04* (2013.01)

(52) U.S. Cl.
CPC .................................... *G10L 17/04* (2013.01)

(58) Field of Classification Search
None
See application file for complete search history.

(56) References Cited

U.S. PATENT DOCUMENTS 5,636,282 A * 6/1997 Holmquist ............ G06F 21/313 379/442
6,092,192 A * 7/2000 Kanevsky ............... G06F 21/32 382/115
6,263,216 B1 * 7/2001 Seydoux ................. G10L 15/20 379/88.02
7,788,095 B2 8/2010 Wasserblat et al.
8,145,482 B2 3/2012 Daya et al.
8,762,161 B2 6/2014 Ashkenazi et al.
9,098,467 B1 * 8/2015 Blanksteen ............. G10L 15/22
9,319,357 B2 * 4/2016 Moyers ................... H04L 51/04
2006/0277043 A1 * 12/2006 Tomes .................... G10L 17/24 704/247
2007/0071206 A1 * 3/2007 Gainsboro .......... H04M 3/2281 379/168
2008/0189171 A1 8/2008 Wasserblat et al.
2009/0319270 A1 12/2009 Gross
(Continued)

*Primary Examiner* — Kevin Ky
(74) *Attorney, Agent, or Firm* — Pearl Cohen Zedek Latzer Baratz LLP

(57) ABSTRACT

A computer-implemented method for enrolling in a database voice prints generated from audio streams may include receiving an audio stream of a communication session and creating a preliminary association between the audio stream and an identity of a customer that has engaged in the communication session based on identification information. The method may further include determining a confidence level of the preliminary association based on authentication information related to the customer and if the confidence level is higher than a threshold, sending a request to compare the audio stream to a database of voice prints of known fraudsters. If the audio stream does not match any known fraudsters, sending a request to generate from the audio stream a current voice print associated with the customer and enrolling the voice print in a customer voice print database.

15 Claims, 8 Drawing Sheets

(56) References Cited

U.S. PATENT DOCUMENTS

| | | | | |
|---|---|---|---|---|
| 2010/0179813 | A1* | 7/2010 | Summerfield | G10L 17/14 704/246 |
| 2010/0204600 | A1* | 8/2010 | Crucilla | A61B 5/097 600/532 |
| 2010/0228656 | A1 | 9/2010 | Wasserblat et al. | |
| 2011/0161076 | A1 | 6/2011 | Davis et al. | |
| 2013/0016815 | A1* | 1/2013 | Odinak | H04M 3/5175 379/88.01 |
| 2013/0144623 | A1* | 6/2013 | Lord | G09B 21/006 704/249 |
| 2014/0330563 | A1 | 11/2014 | Faians et al. | |
| 2014/0343943 | A1* | 11/2014 | Al-Telmissani | G10L 17/00 704/246 |
| 2014/0348308 | A1* | 11/2014 | Krause | G10L 17/00 379/88.02 |
| 2015/0112680 | A1* | 4/2015 | Lu | G10L 17/04 704/244 |
| 2015/0229765 | A1* | 8/2015 | Hirata | H04M 3/4931 379/88.03 |
| 2015/0293755 | A1 | 10/2015 | Robins et al. | |
| 2015/0370784 | A1 | 12/2015 | Nissan et al. | |
| 2016/0189706 | A1* | 6/2016 | Zopf | G10L 15/063 713/320 |
| 2016/0275952 | A1* | 9/2016 | Kashtan | G10L 17/00 |

* cited by examiner

SYSTEM AND METHOD FOR VOICE PRINT GENERATION

FIELD OF THE INVENTION

This invention relates generally to the field of authentication of individuals.

BACKGROUND OF THE INVENTION

Large organizations, such as commercial organizations, financial institutions, government agencies or public safety organizations conduct communication sessions, also known as interactions, with individuals such as customers, suppliers and the like on a daily basis.

Communication sessions between parties may involve exchanging sensitive information, for example, financial data, transactions and personal medical data. Thus, in communication sessions with individuals, it may be necessary to authenticate the individual, for example before offering the individual any information or services. When a communication session begins, a system or agent on behalf of one party may first identify the individual. Some organizations use voice prints to authenticate the identity of individuals.

The term “voice print” as used herein is intended to encompass voice biometric data. Voice prints are also known by various other names including but not limited to spectrograms, spectral waterfalls, sonograms, and voicegrams. Voice prints may take many forms and may indicate both physical and behavioral characteristics of an individual. One type of voice print is in the form of time-varying spectral representations of sounds or voices. Voice prints may be in digital form and may be created from any digital audio recordings of voices, for example but not limited to audio recordings of communication sessions between call center agents and customers. A voice print can be generated in many ways known to those skilled in the art including but not limited to applying short-time Fourier transform (STFT) on various (preferably overlapping) audio streams of a particular voice such as an audio recording. For example, each stream may be a segment or fraction of a complete communication session or corresponding recording. A three-dimensional image of the voice print may present measurements of magnitude versus frequency for a specific moment in time.

A speaker’s voice may be extremely difficult to forge for biometric comparison purposes, since a myriad of qualities may be measured, ranging from dialect and speaking style to pitch, spectral magnitudes, and format frequencies. The vibration of an individual’s vocal chords and the patterns created by the physical components resulting in human speech are as distinctive as fingerprints. Depending on how they are created, voice prints of two individuals may differ from each other at about one hundred (100) different points.

It should be noted that known methods for the generation of voice prints do not depend on what words are spoken by the individual for whom the voice print is being created. They simply require a sample of speech of an individual from which to generate the voice print. The larger the sample, the more information may be included in the voice print. As such those methods may be said to be “text-independent”.

Voice prints may be used to authenticate individuals in any communication session that includes a voice element by at least one party. Such communication sessions are referred to herein as voice communication sessions and include but are not limited to communications between an individual, e.g., human, and apparatus or machinery such as an Automatic Voice Response (AVR) unit or an Integrated Voice Response (IVR) unit, telephone communications, Voice Over IP (VOIP) communications, and video conferences. It should be noted that in voice communications the voice element may be no more than a short speech such as the utterance of a particular phrase, with the remainder of the communication by both parties taking place by other means such as email, instant messaging or any means using a man-machine interface.

SUMMARY OF THE INVENTION

Some embodiments of the invention provide systems and methods for generating a voice print for an individual. A method according to an embodiment may comprise searching one or more recordings of speech by the individual for a phrase that is uttered more than once in said one or more recordings; locating at least a predetermined number of utterances of said phrase, said predetermined number being more than one; and using the located utterances of the phrase to generate a voice print for the individual. The phrase may be a predetermined phrase that is expected to be present in the recordings or it may be a phrase found to be repeated among the recordings, and the search may be carried out in different ways, for example depending on whether the phrase is predetermined or not.

The term “utterance” is intended to have its usual meaning, e.g., the action of saying the phrase aloud. The generation of the voice print may use text-independent techniques known in the art. For example, in the generation of the voice print no account needs to be taken of what words are spoken by the individual. Utterances of a phrase may be used to generate a voice print in the same way as generation of a voice print from any sample of speech by the individual.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE INVENTION

Figure 1:
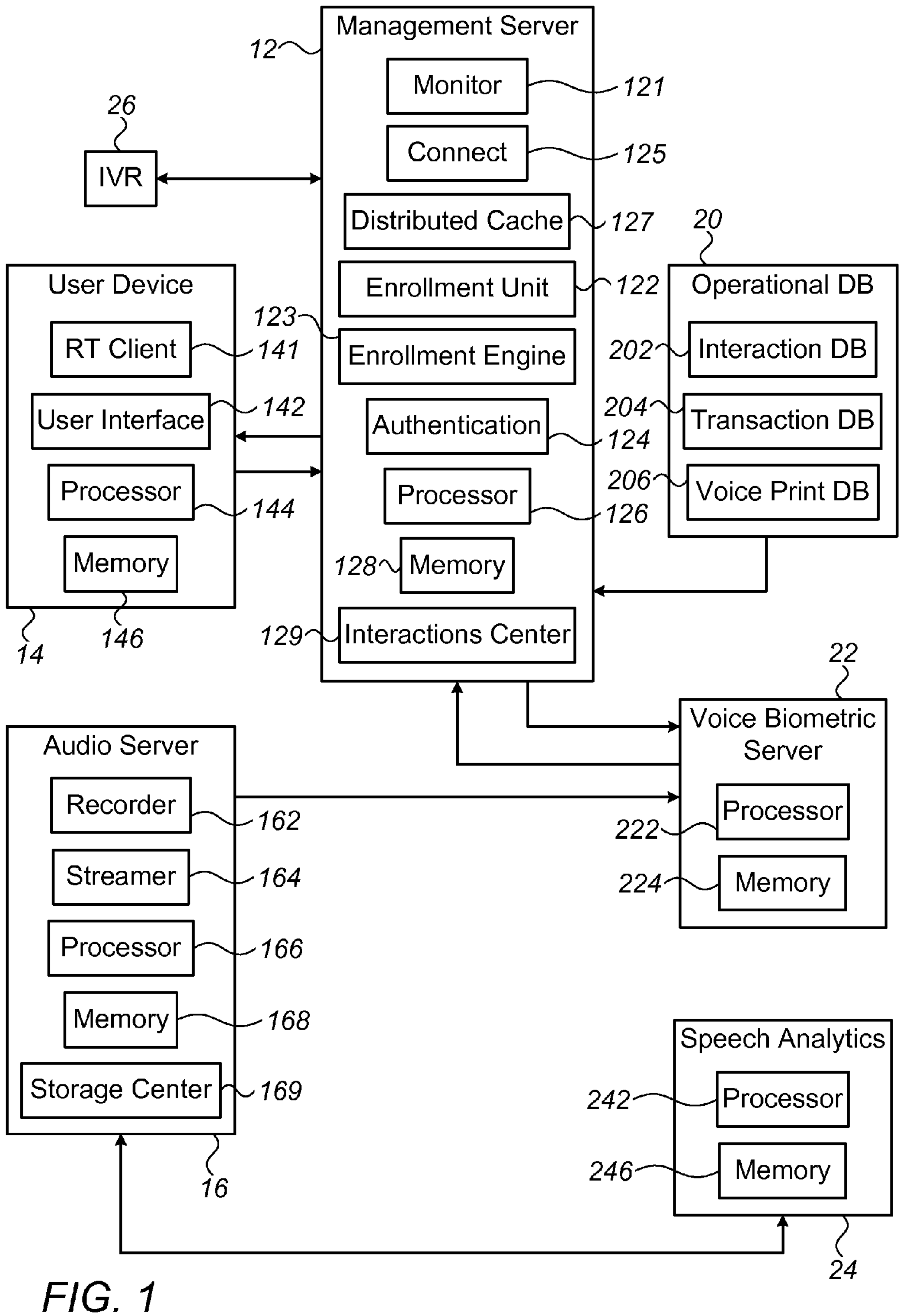
FIG. 1 is a high level block diagram of an exemplary system for authenticating and enrolling customers according to some embodiments of the present invention.

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention.

Although some embodiments of the invention are not limited in this regard, unless specifically stated otherwise, as apparent from the following discussions, it is appreciated that discussions utilizing terms such as, for example, "processing," "computing," "calculating," "determining," "establishing", "analyzing", "checking", "receiving", "selecting", "sending a request", "comparing", "enrolling", "reporting", "prompting", "storing" or the like, refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Although some embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently.

When used herein, the term "phrase" unless otherwise stated encompasses any sequence of words and "word" unless otherwise stated includes numbers, e.g. "one", "two" etc.

The terms "communication session" and "interaction" are used herein interchangeably and are intended to have the same meaning. The term "voice interaction" denotes an interaction or communication that includes a voice element, however small, by at least one party.

Systems and methods according to some embodiments of the invention relate to the enrollment of individuals using voice prints, for example to enable them to use particular services. Some goods and services are promoted via fully automated channels, for example using IVR units possibly with the customers using mobile devices, involving little or no human intervention on the part of the party offering the goods or services. These fully automated channels are sometimes referred to as "self-service" channels. They are popular with providers because of the limited requirement for human intervention, sometimes leading to cost reduction. Voice prints may be used to authenticate customers for such goods or services, in which case a voice print for the customer needs to be generated. The enrollment and authentication of an individual, e.g. customer, may use so-called "text dependent" voice prints, which are based on particular words. In order to be authenticated, the individual has to utter those particular words.

Authentication using text-dependent voice prints may be advantageous in that it may reduce the processing required since only a portion of speech of an individual is analyzed.

It follows that, in order to be enrolled for subsequent authentication using a text dependent voice print, an individual may be required to utter the speech, e.g., a sequence of words, and for reliability of the process several renditions or utterances may be required. For example, an individual may be required to repeat the speech a predetermined number of times, such as three, in order to be enrolled. This "active" enrollment, which requires positive action on the part of an individual, may lead to low take-up rates by such individuals. Therefore, it is desirable to reduce the amount of effort required by individuals to enroll for authentication using a voice print.

Some embodiments of the invention enable the creation of a voice print for an individual by searching recordings of speech by the individual for a phrase that is uttered a multiple predetermined number of times, such as three; and using the predetermined number of utterances of the phrase to create a voice print for the individual based on the phrase. The phrase may be predetermined, for example a phrase known to be used regularly in certain kinds of communication session, or it may be a phrase that is found in the recordings to be repeated. Different methods for locating the audio information for the generation of the voice print may be required depending on whether the phrase is predetermined or not.

A "text-dependent" voice print created according to some embodiments of the invention is so called because it is based on a limited amount of speech by the individual, namely an utterance of a particular phrase. It is referred to as "text-dependent" because it relies on recognizable words that can be converted to text. However, conversion of the utterance to text is not essential for all embodiments of the invention. In order for an individual to be authenticated using a text-dependent voice print, the individual needs to utter that particular phrase.

According to some embodiments of the invention, creation of a voice print can be based on any past communication sessions with an individual that include some speech by the individual. No positive action by the individual needs to be required for the generation of the voice print. If the individual repeats the phrase in a new communication session, the individual can be authenticated. Similarly, no positive action on the part of the individual needs to be required for the authentication of the individual. According to some embodiments of the invention, the consent of the individual to enrollment and/or authentication in this way may be required in order to satisfy regulatory requirements in some jurisdictions.

It is possible for a phrase to be repeated several times in one communication session or conversation involving an individual, in which case a voice print could be created using information from one recording of speech by the individual, e.g., one audio file. It is more likely that it will be necessary to search multiple recordings, e.g., multiple audio files, in order to find the predetermined number of utterances for creation of the voice print.

According to some embodiments of the invention, speech analytics may be used to extract a particular phrase from recordings of speech, for example in previous calls, for use in an enrollment process. For example, speech analytics, such as phonetics and transcription, may be used to detect a particular phrase that appears three or more times across previous calls. For example: "My account number is 123-456" or "No thank you, I'm done".

Recordings of communication sessions such as voice calls may be separated into segments. According to some embodiments of the invention, calls or call segments which have been identified as including a particular phrase, each of which may include audio and a corresponding timestamp, may be used to automatically create a text dependent voice print. The next time a caller calls, e.g., to an IVR unit, the caller may be requested to say the phrase, for example: "Please say your account number" in order to be authenticated.

If the caller is successfully authenticated, e.g., there is sufficient correspondence between the voice print and the requested utterance of the phrase, e.g., account number, during a subsequent call, this new utterance of the phrase can be used to update or enrich the voice print for the caller for better future performance.

Some embodiments of the invention may use text-independent biometric techniques on phrases (such as a birthdate) to authenticate customers without requiring previous active enrollment. A spoken phrase may be captured, e.g., recorded, in a text dependent process, following which a text-independent process may be used to create a text-dependent voice print. Thus embodiments of the invention may use a combination of text-dependent and text-independent technologies.

According to some embodiments, the phrase which may be referred to as a pass phrase may be unique to the individual and may be stored in association with other data relating to a particular individual for use in the subsequent authentication of the individual.

Reference is now made to FIG. 1, which is a high-level block diagram of a system for performing any of generating voice prints, authenticating individuals and enrolling individuals in accordance with some embodiments of the present invention. At least some of the components of the system illustrated in FIG. 1 may for example be implemented in a call center environment. As used herein "call center", otherwise known as a "contact center" may include any platform that enables two or more parties to conduct a communication session. For example, a call center may include one or more user devices that may be operated by human agents or one or more IVR units, either of which may be used to conduct a communication session with an individual.

The system may include a plurality of user devices 14 (only one is shown) that may for example be operated by agents of a call center during, before and after engaging in a communication session with an individual, one or more audio servers 16 (only one is shown) to record communication sessions, a management server 12 configured to control the enrollment and/or authentication processes, an operational database 20 that includes data related to individuals and communication sessions, a voice biometric server 22 configured to generate voice prints of the individuals, a speech analytics server 24, and an IVR unit 26.

According to some embodiments of the invention, the speech analytics server may be configured to analyze recordings of speech by the individual to locate at least a predetermined number of utterances of a phrase; and the voice biometric server may be configured to generate a voice print for the individual by analyzing the utterances located by the speech analytics server.

It should be noted that the various servers shown in FIG. 1 may be implemented on a single computing device according to embodiments of the invention. Equally, the functions of any of the servers may be distributed across multiple computing devices. In particular, the speech analytics and voice biometrics functions need not be performed on servers. For example, they may be performed in suitably programmed processors or processing modules within any computing device.

Management server 12 may receive information from any of user device 14, from IVR unit 26, from operational data base 20 and from voice biometric server 22. Voice biometric server 22 may generate voice prints from audio streams received from audio server 16. Any of audio server 16, IVR unit 26 and user device 14 may be included in a call center or contact center for conducting and recording communication sessions. According to some embodiments of the invention, management server 12 may serve the function of an applications server.

During a communication session, management server 12 may receive from user device 14 or IVR unit 26 a request to authenticate an individual. After performing the authentication and while the communication session still proceeds, management server 12 may send a notification to the user device or the IVR unit 26, confirming whether or not the individual was successfully authenticated. Further, according to some embodiments of the invention, management server 12 may perform passive (seamless) authentication of individuals and control enrollment of voice prints.

Management server 12 may include an enrollment unit 122, which may also be referred to as an enrollment server, configured to control the enrollment process of new voice prints according to enrollment logic. Management server 12 may further include an enrollment engine 123 which may comprise a module responsible for managing (e.g. collecting and dispatching) enrollment requests and "feeding" the enrollment unit. Management server 12 may further include an authentication unit 124, which may also be referred to as an authentication server or an authentication manager, to control automatic and seamless authentication of the individual during the communication session.

Management server 12 may further include at least one processor 126 and at least one memory unit 128. Processor 126 may be any computer, processor or controller configured to execute commands included in a software program, for example to execute the methods disclosed herein. Enrollment manager 122 and authentication server 124 may each include or may each be in communication with processor 126. Alternatively, a single processor 126 may perform both the authentication and enrollment methods. Processor 126 may include components such as, but not limited to, one or more central processing units (CPU) or any other suitable multi-purpose or specific processors or controllers, one or more input units, one or more output units, one or more memory units, and one or more storage units. Processor 126 may additionally include other suitable hardware components and/or software components.

Memory 128 may store codes to be executed by processor 126. Memory 128 may be in communication with or may be included in processor 126. Memory 128 may include a mass storage device, for example an optical storage device such as a CD, a DVD, or a laser disk; a magnetic storage device such as a tape, a hard disk, Storage Area Network (SAN), a Network Attached Storage (NAS), or others.

According to some embodiments of the invention, management server 12 may also include monitor 121 configured to listen for events and to dispatch them to other components of the system subscribing to monitor 121, such as a client operating on a user device 14 or in IVR unit 26.

According to some embodiments of the invention, management server may additionally include a connect module 125 including a distributed cache 127, which in some embodiments may be part of memory 128. The connect module 125 is configured to connect real time (RT) clients operating on user devices such as user device 14 or IVR unit 26 with backend components of the system such as the operational database 20 and the voice biometric server 22. The distributed cache 127 may comprise an in-memory database, used for fast data fetching in response to queries, e.g. from a user device 14 or IVR unit 26.

According to some embodiments of the invention, management server may additionally include an interaction center 129. The functions of the interaction center 129 include managing the recording of interactions. For example the interactions center may be a module that, for example during a telephone call, interacts with the telephony switch or packet branch exchange (PBX, not shown in FIG. 1) and computer telephony integration (CTI, not shown in FIG. 1) of an individual communicating with the user of a user device 14 to obtain start and/or end of call events, metadata and audio streaming. The interaction center 129 may extract events from a call sequence and translate or convert them for storage, indexing and possibly other operations in a backend system such as operational database 20.

User device 14 may for example be operated by an agent within a contact center. For example, user device 14 may include a desktop or laptop computer in communication with the management server 12 for example via any kind of communications network. User device 14 may include a user interface 142, a processor 144 and a memory 146. User interface 142 may include any device that allows a human user to communicate with the processor. User interface 144 may include a display, a Graphical User Interface (GUI), a mouse, a keyboard, a microphone, an earphone and other devices that may allow the user to upload information to processor 144 and receive information from processor 144. Processor 144 may include or may be in communication with memory 146 that may include codes or instructions to be executed by processor 144.

According to some embodiments of the invention, user device 14 may further include a real time client 141 which may take the form of client software running on a desktop for example associated with an agent at user device 14. The real time client 141 may be configured to "listen" to events and extract information from applications running on the desktop. Examples of such events may include but are not limited to:

- the start of a communication session with an individual
- the resolving of an individual, e.g. the retrieval of information from the operational database purporting to identify the individual
- the commencement of an utterance by the individual of a predetermined phrase
- the end of the utterance of the predetermined phrase.

Similarly, in some communication sessions, the IVR unit 26 may perform some of the functions of user device 14 and therefore the IVR unit may also include a real time client performing the same functions as the real time client 141.

During a communication session, user device 14 or IVR unit 26 may receive identification information from an individual, for example, the name of the individual, a customer number associated with the individual, an ID number and/or a social security number. Additionally or alternatively, device 14 or IVR unit 26 may receive identification information related to the individual automatically from details related to the "call", for example, the telephone number from which the individual calls, or the area (PIN code) from which the individual calls. An operator of user device 14 may use user interface 144 to upload and receive information related to the identity of the individual from database 20 via management server 12. Similarly an IVR unit may retrieve such information. The individual may be asked so called know your customer "KYC" questions related to data stored in database 20. For example, the individual may be asked to provide personal details (e.g., credit card number, and/or the name of his pet) or to describe the latest actions performed (e.g., financial transactions). During the communication session, an audio segment or an audio stream may be recorded and stored in audio server 16.

Audio server 16 may include an audio recorder 162 to record the individual's voice, an audio streamer 164 to stream the recorded voice, a processor 166 to control the recording, streaming and storing of the audio stream, and a memory 168 to store code to be executed by the processor. Audio recorder 162 may include any components configured to record an audio segment (a voice of an individual) of the communication session. Processor 166 may instruct audio streamer 164 to receive audio segment from recorder 162 and stream the segment into audio streams or buffers. Audio server 16 may further include, or may be in communication with, any storage unit(s) for storing the audio stream, e.g., in an audio archives. The audio archives may include audio data (e.g., audio streams) of historical communication sessions.

Audio server 16 may, according to some embodiments of the invention, include storage center 169 configured to store historical and ongoing speech and calls of individuals, for example but not limited to calls between individuals and IVR unit 26.

Operational database 20 may include one or more databases, for example, at least one of an interaction database 202, a transaction database 204 and a voice print database 206. Interaction database 202 may store non-transactional information of individuals, such as home address, name, and work history related to individuals such as customers of a company on whose behalf a call center is operating. Voice prints for individuals may also be stored in the interaction database 202 or in a separate voice print database 206. Such non-transactional information may be provided by an individual, e.g., when opening a bank account. Furthermore, database 202 may store interaction information related to previous communication sessions conducted with the individual, such as but not limited to the time and date of the session, the duration of the session, information acquired from the individual during the session (e.g., authentication information, successful/unsuccessful authentication). Applications used in a system according to some embodiments of the invention may also be stored in operational database 20.

Transaction database 204 may include transactional information related to previous actions performed by the individual, such as actions performed by the individual (e.g., money transfer, account balance check, order checks books, order goods and services or get medical information.). Each of databases 202 and 204 may include one or more storage units. In an exemplary embodiment, interaction database 202 may include data related to the technical aspects of the communication sessions (e.g., the time, date and duration of the session), a Customer relation management (CRM) database that stores personal details related to individuals or both. In some embodiments, interaction database 202 and transaction database 204 may be included in a single database. Databases 202 and 204 included in operational database 20 may include one or more mass storage devices. The storage device may be located onsite where the audio segments or some of them are captured, or in a remote location. The capturing or the storage components can serve one or more sites of a multi-site organization.

Audio or voice recordings recorded, streamed and stored in audio server 16 may be processed by voice biometric server 22. Voice biometric server 22 may include one or more processors 222 and one or more memories 224. Processor 222 may include or may control any voice biometric engine known in the art, for example, the voice biometric engine by Nuance Inc. to generate a voice print (e.g., voice biometric data) of at least one audio stream received from audio server 16. The voice print may include one or more parameters associated with the voice of the individual. Processor 222 may include or may control any platform known in the art, for example the platform by Nuance Inc. USA, for processing (e.g., identifying and comparing) voice prints generated from two or more audio streams. When an audio stream associated with an individual is being a candidate for enrollment, voice biometric server 22 may receive from management server 12 verification of the identity of the individual. Following the verification, voice biometric server 22 may generate a voice print of the audio stream related to the individual. Processor 222 may further be configured to compare the generated voice print to other voice prints previously enrolled and stored, for example, in one or more storage units associated with voice biometric server 22. The storage units associated with voice biometric server 22 may include voice prints stored at a potential fraudster list (i.e., watch list, black list, etc.), voice prints related to the individual that were enrolled following previous communication sessions with the individual, and/or voice prints related or associated with other individuals. Memory 224 may include codes or instructions to be executed by processor 222. In some embodiments, memories 146, 168 or 224 may include the same elements disclosed with respect to memory 128.

Speech analytics server 24, similarly to voice biometric server 22, may comprise one or more processors, such as processor 242 and memory 246.

Methods and systems for generating voice prints according to some embodiments of the invention will now be described in general terms followed by a more detailed description with reference to FIGS. 2 to 7.

The authentication of an individual using a phrase is called text dependent voice authentication since the customer is asked to say a specific phrase that can be represented as text. This is in contrast to text independent voice authentication where a customer or other individual may be authenticated by speaking freely and is not required to say something specific.

The enrolment may be done actively by asking an individual, e.g., customer, to make a call to a specific number and undergo an active enrollment process, which may for example involve the customer saying a chosen phrase. The customer may be asked to do this several times, which some individuals find onerous or intrusive and do not continue with the enrollment. The result of the enrollment process is the creation of a voice print for the individual. After enrollment, when an individual makes a call, his voice is compared to this voice print, for example by the individual saying the chosen phrase, and the new utterance being compared to the voice print which is based on several utterances.

Some embodiments of the invention may bypass this enrollment process and instead provide a way to enroll individuals passively, without asking them to do anything. This may be done using historical recordings of the individual's voice. Systems according to some embodiments of the invention may review all, or a selection of, recordings of previous calls of a specific individual. Then, for example using speech analytics and/or text analytics, a pass phrase for the individual may be found and used to create a voice print. The next time a communication session is initiated with the individual, for example the when the individual makes a call, the individual can be authenticated without having positively enrolled previously. According to some embodiments, even the authentication can be done without the individual being aware that it is being done.

Some embodiments of the invention described herein may use one of two work flows to find a pass phrase for an individual in past, historical, voice communication sessions, e.g., calls or other voice communications made and recorded previously. These are merely examples and other possible work flows are possible according to the invention including flows that use one or more operations from both of the work flows described herein.

Sometimes one or more phrases to be found in recorded speech may be known before the search commences. In this case, it is possible to search historical calls or other voice communications and, using speech analytics technology, look for specific phrases that might have been spoken that can be used for the generation of a voice print. This flow may be useful where communication sessions have a defined structure. Some organizations that have a well-defined structure that is implemented in calls with customers. For example, in some call structures, at the beginning of the call the customer may always be asked to state his account number/address/etc. in which case a search may focus on one or more of these which may then be used to generate a voice print.

In one possible implementation, during a spontaneous interaction between a customer and an agent, the agent will ask for the customer's account number. The customer may answer "my account number is 6632597". Each call may be recorded and stored in a storage center such as storage center 169 of FIG. 1. Then, a word search engine, e.g., using speech analytics techniques operating in speech analytics server 24, may be run on the recorded calls and will look for the phrase "my account number is 6632597". If the phrase is found, the start time and end time of the phrase may be marked. The enrollment engine 124 may collect the interaction and metadata indicating the utterance location in the interaction, and use this audio segment for passive enrollment. When a predetermined number of utterances of "my account number is 6632597" have been found, for example in recordings of different calls, a voice print may be created and the individual, in this case the customer, may be enrolled, for example to a customer database, using the voice print.

During a subsequent authentication phase, the individual may be asked to say the specific phrase, e.g., "my account number is 6632597" or just "6632597". This may be done in a number of ways depending on what the phrase is. For example, if it is the account number, the individual may be asked to state his account number. Alternatively, the pass phrase which may have been stored as text may be converted to speech, and the resulting speech may be used to ask the individual to state his pass phrase. For example, an agent or system may say "repeat after me (the pass phrase)". This may be a routine part of the conversation and, depending on the pass phrase, the individual may not be aware that he is being authenticated. He will answer, e.g., with "My account number is 6632597", and this will be matched against the stored voiceprint. If the utterance of the pass phrase results in the individual being authenticated, this utterance may be stored and used for voiceprint enrichment. One purpose of this enrichment is to reduce the false rejection rate on authentication since the more audio information that is used to create the text-dependent voice print, the lower will be the false rejection rate on authentication.

In other methods according to some embodiments of the invention, the phrase to be used for a pass phrase and generation of a voice print may not be known and thus prior information about what phrase is to be looked for may not be available. In that case, using speech analytics and text analytics technologies, all or a selection of the voice communication sessions, e.g., calls, of a specific individual may be searched to find repeated phrases in them.

A repeated phrase may be used in future authentication, e.g., for self-service channels. Thus, in addition to, or alternatively to, searching for an utterance of a particular phrase, for example using speech analytics, some embodiments of the invention may provide a method in which several calls or other voice interactions of a customer are collected, repeated phrases are extracted, again possibly using speech analytics, and these phrases are used for enrollment and verification.

A possible example is that of a customer that called an entity several times to inquire about his bill and said in some of these calls the sentence "I have a problem with my bill". All these calls may have been recorded and stored in storage center 169. Then, speech and text analytics engines at speech analytics server 24 may analyze the recorded calls, look for phrases that appear in several (e.g., at least three) calls and mark the start time and end time of the repeated phrases such as "I have a problem with my bill". The enrollment engine 123 may collect interaction and metadata indicating the utterance location in the interaction, and use this audio segment "I have a problem with my bill" for passive enrollment. The phrase "I have a problem with my bill" may be stored in text form as the pass phrase for the individual, for example in association with a voice print in database 206.

During a subsequent authentication phase, the customer may be asked to say the pass phrase, either by using text-to-speech conversion of a stored pass phrase, or if the pass phrase happens to be the account number or data of birth or some other item of customer specific data, by asking for that data. The customer should answer, e.g., "I have a problem with my bill" (even if this is not the reason for the current call, it is just a pass phrase in this case) which will matched against the stored text dependent voiceprint. Again, in this embodiment, the new utterance may be stored and used for voiceprint enrichment.

Retrieving recordings associated with a specific individual may be a fully automated process, which means that all the recordings of a given individual may be retrieved without any manual assistance.

The use of recordings made at the time of authentication to enrich the voice print for future uses has the benefit of continuing to improve the authentication process with each new instance of authentication.

A sequence diagram showing a possible message and information flow in a system according to some embodiments of the invention will now be described with reference to FIGS. 2A and 2B. This embodiment takes the example of a customer calling a call center. Other embodiments of the invention may use a similar sequence of events for other kinds of individual participating in other kinds of communication session.

Figure 2A:
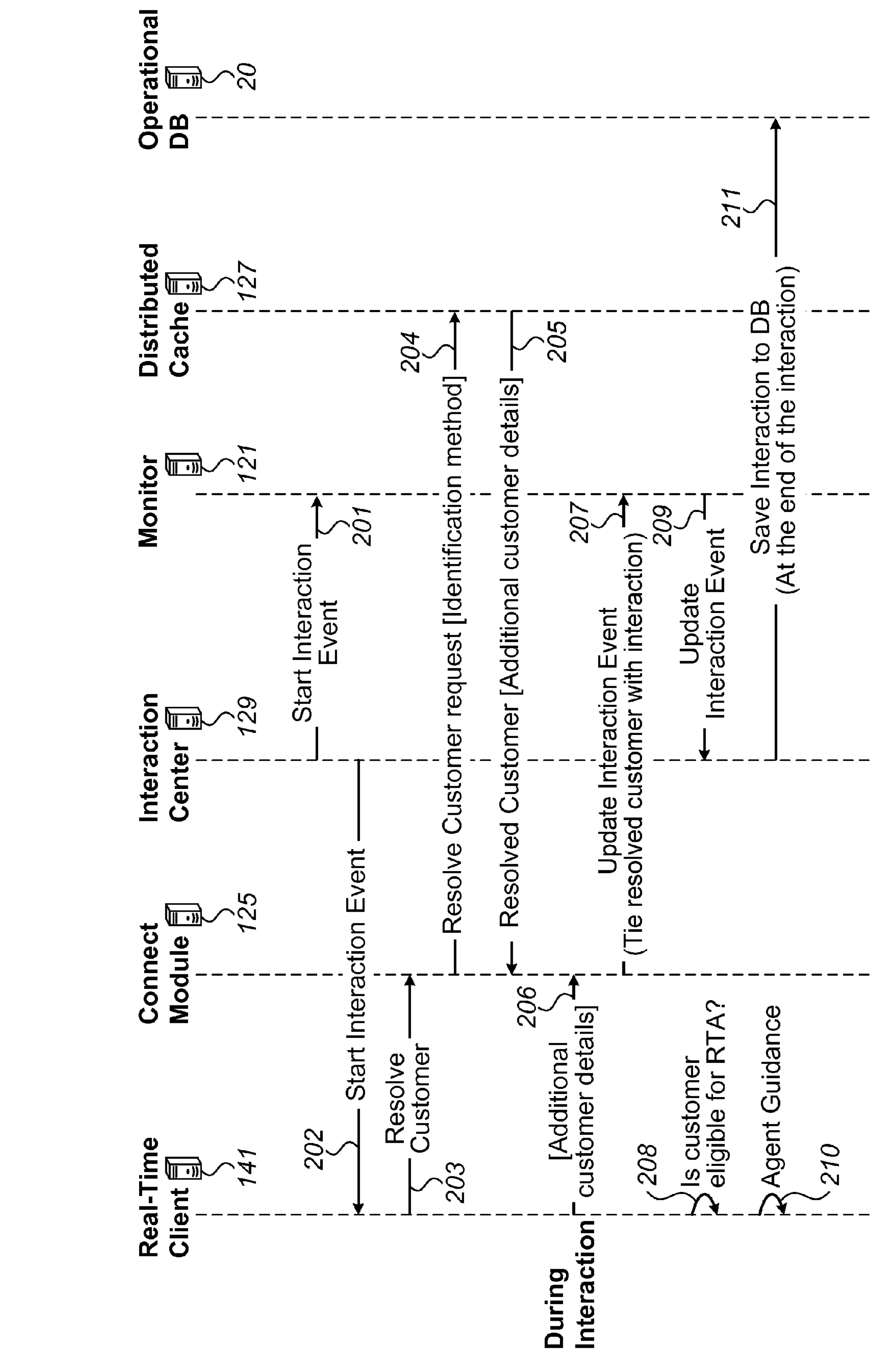
FIGS. 2A and 2B are sequence diagrams for the enrollment of individuals according to embodiments of the invention.

Referring first to FIG. 2A, when a call or other voice interaction is initiated, a "Start interaction event" takes place.

At 201, the interactions center 129 dispatches the Start interaction event to the monitor 121.

At 202, the monitor 121 sends the Start interaction event to its subscribers, in this case to the RT client 141.

At 203, the customer is resolved. According to some embodiments of the invention, an individual may be resolved prior to being authenticated. Resolving an individual may include determining, for example from stored data, who the individual purports to be, for example after the individual has provided a name, identification (ID) number or other ID information. In the flow of FIG. 2A, the RT client 141 resolves the customer ID by finding a mapping for the customer ID. This may be done from screen data provided as part of a background CRM application running at user device 14.

Alternatively, RT client 141 may send a resolve request to the connect module 125 which forwards the request to the distributed cache 127. Thus, at 204, the connect module 125 sends a request to the distributed cache 127 for the customer to be resolved. The request may include some information related to the customer obtained by the RT client 141 at the start of the interaction, for example simply customer name. The distributed cache 127 may hold a mapping of customer names to IDs, and the IDs may be associated with additional information about customers.

At 205, following resolution of the customer in response to the request at 204, the distributed cache 127 returns to the connect module 125 the customer ID as well as additional details relating to the customer.

At 206, the customer ID and additional details relating to the customer are forwarded by the connect module 125 to the RT client 141. The additional details may include, for example, phone number, credit risk or any other business data.

At 207, an "Update interaction event" is sent from the connect module 125 to the monitor 121 to tie, e.g., associate, the resolved customer with the interaction by attaching the resolved customer ID to the interaction.

Next, at 208, a query is run at the RT client 141 to determine whether the customer is eligible for real time authentication. Business rules may run in the RT client logic to define whether the interaction, or individual, needs to be authenticated. This may be based on one or more factors including but not limited to whether the customer has a voiceprint (enrolled), and whether the customer gave his/her consent.

At 209, an update interaction event takes place. Here, business data and RT client information collected in RT client 141 are updated in the interaction stored at the interaction center to be used in the enrollment phase, for example by monitor 121 sending an update message to the interaction center 129.

At 210, an agent or other user of user device 14 might be guided to encourage the customer to speak more if not enough net audio was collected, or to mark the interaction as on-behalf or any business data that might affect the enrollment.

At 211, a save interaction event occurs, the interaction is closed, and the interaction and associated data collected during the interaction are saved to the operational database 20, for example as metadata relating to the interaction. In an additional parallel operation, not shown in FIG. 2A, the audio data from the interaction is saved to the storage center 169.

Figure 2B:
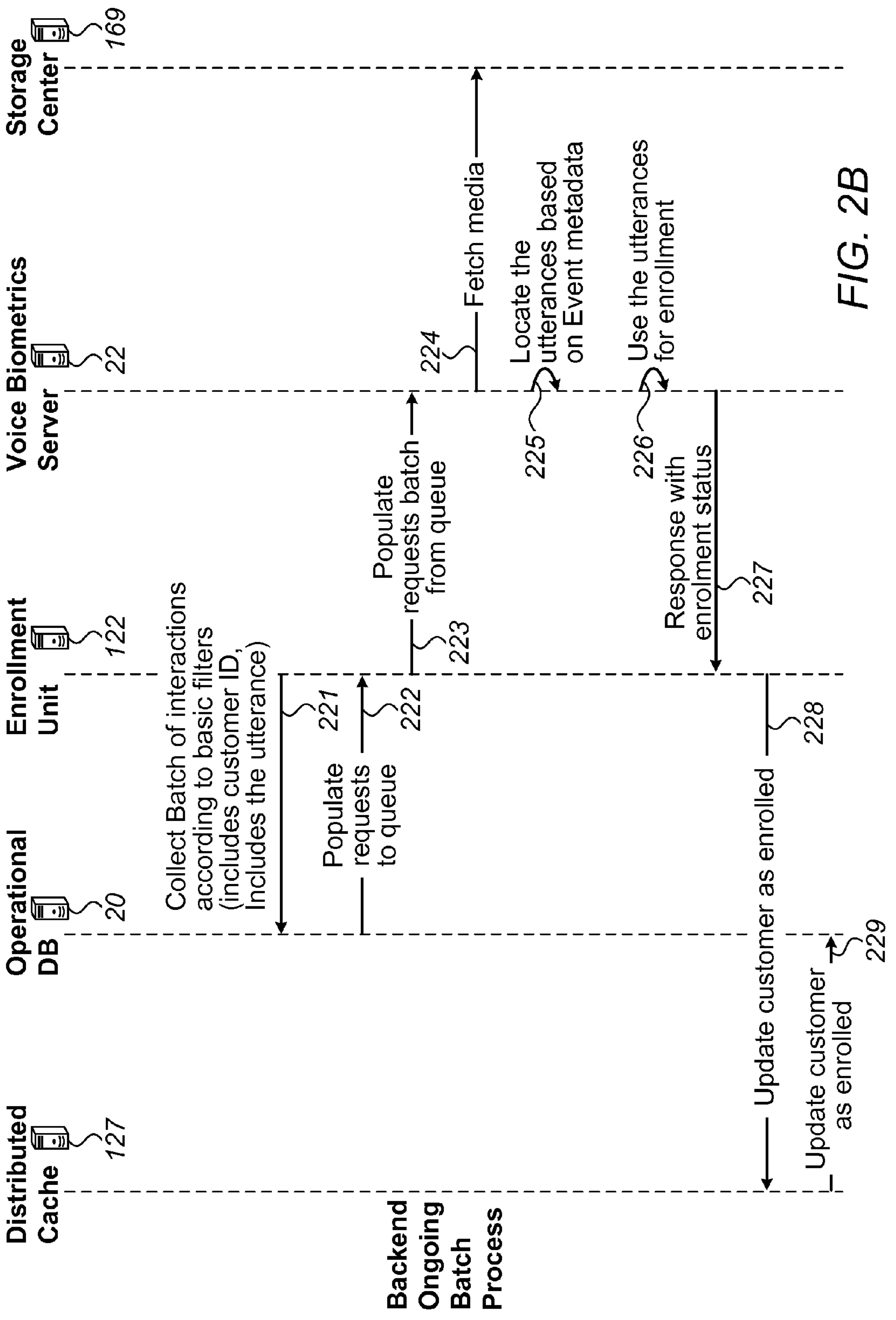

The enrolment of a customer may be carried out as part of a backend process illustrated in FIG. 2B.

At 221, a batch of interactions for a particular individual that has been newly recorded in operational database 20 is collected. The arrow shows enrollment unit 122 running a query on operational database 20. According to some embodiments of the invention, not all interactions are collected. One or more filters may be applied so that only a selection of new interactions is collected. The one or more filters may be set via an application and may set selection criteria such as call duration, agent name/ID, level of authentication or any other business data based filter. The one or more filters may be applied on a query to bring candidate interactions for enrolment. The batch is fed to the enrollment unit 122.

At 222, requests for enrollment are pushed from operational database 20 to a queue in the enrollment unit 122 for processing. Each request may relate to one individual.

At 223, a batch of requests is sent from the queue in the enrollment unit 122 to the voice biometrics server 22 for processing.

At 224, for each request for enrollment of an individual, the voice biometrics server 22 requests from the storage center 169 media corresponding to interactions involving that individual, for example recordings corresponding to interactions for which other data such as customer ID is held at operational database 20.

At 225, the voice biometrics server 22 locates the utterances of the predetermined phrase in the recordings. This may be based on events that have been marked during the interactions, e.g., the point at which an individual utters a phrase such as his account number. Then, the specific part of the recordings or calls or interactions that contain the utterance may be cropped for further use.

It should be noted that speech analysis may not be required in order to locate the utterance at 225. The point in a voice interaction at which the predetermined phrase starts and finishes may be recorded as an event in the interaction enabling the phrase to be isolated. However, according to some embodiments of the invention, speech analysis may be used to mark the start or end or both of a particular, possibly predetermined, phrase in a portion of speech.

At 226, the utterances are used for enrollment. This may include, for example, the enrolment engine 123 taking the cropped portions of the interactions, which may be audio recordings, which consists of the relevant utterances predetermined for creation of a voice print.

At 227, the voice biometrics server 22 responds to the enrollment unit 122 with the enrollment status, for example confirming whether or not the individual was successfully enrolled.

At 228, the distributed cache 127 is notified by the enrolment unit 122 that the enrolment status of the individual should be updated to "enrolled".

At 229, the distributed cache 127 notified the operational database 20 that the enrolment status of the individual should be updated to "enrolled".

A possible work flow for the creation of a voice print according to some embodiments of the invention is shown in FIG. 9. FIG. 9 refers to the specific example of a customer in a call, for example with an agent at a call center. The flow of FIG. 9 is also applicable to any other individual and any kind of voice communication session. The flow of FIG. 9 may be used for situations in which the customer is expected to utter a predetermined phrase at least once in a voice interaction, and that phrase is to be used for the creation of a voice print. It should be noted that the predetermined phrase may be the same for each customer or may differ from one customer to another. For example, the predetermined phrase may be a customer account number which will be different for each customer. Further, the predetermined phrase may not be of the same type for each customer and may, for example, be account number for one customer and date of birth for another.

Figure 3:
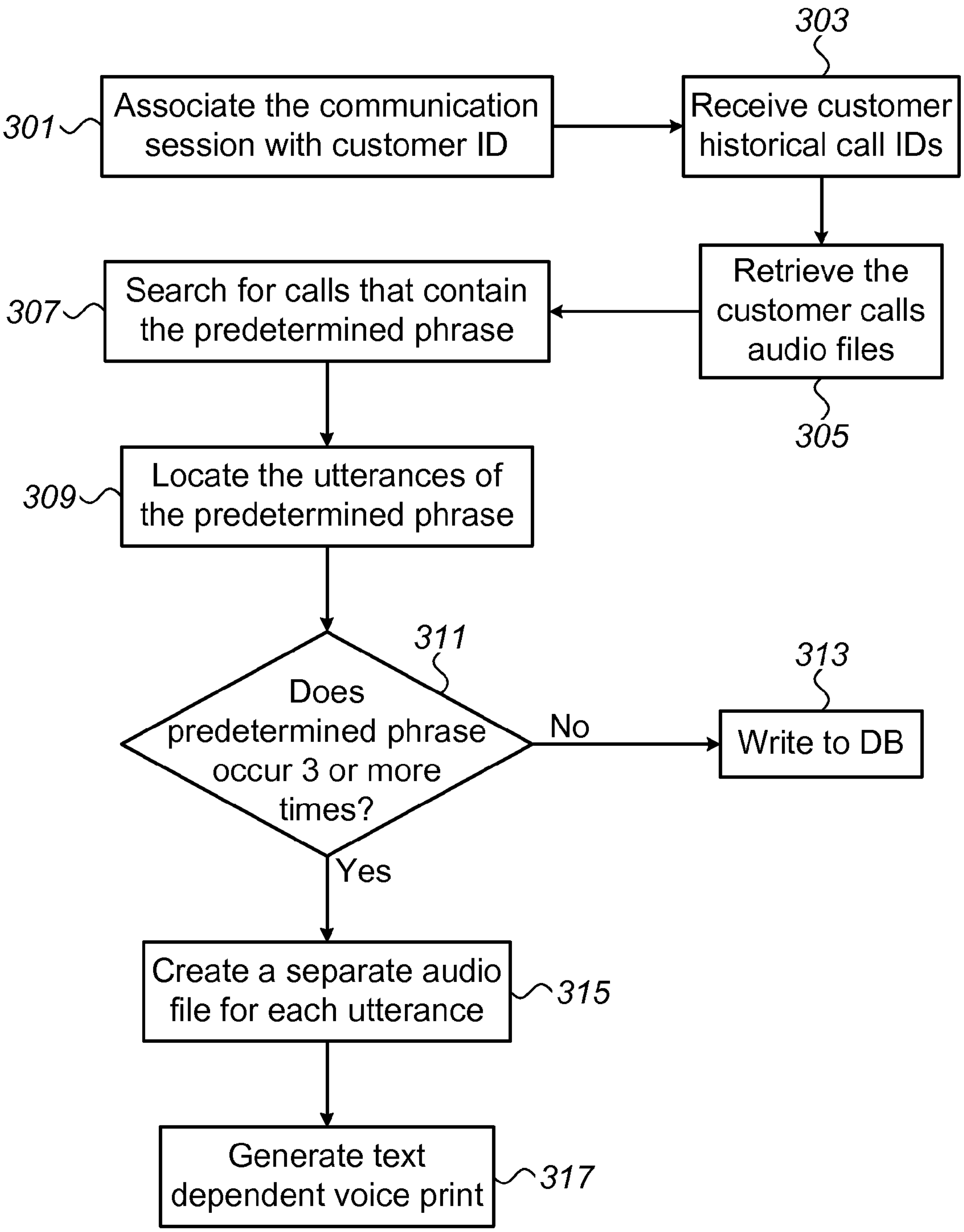
FIG. 3 is a flow chart of operations in a search for utterances of a predetermined phrase in recordings of speech according to embodiments of the invention.

Operation 301 shown in FIG. 3 is the association of a communication session with a customer ID, and may be equivalent to operation 205 in FIG. 2A and may be performed in connect module 125. Operation 301 may take place before an individual is authenticated and may include resolving a customer ID, for example using automatic number identification, such as caller ID, or retrieving some other unique identifier for the customer. In this embodiment, the voice print is generated in response to a new communication session commencing with a particular customer, but not necessarily in real time since the voice print is to be used in a future interaction with the individual. The phrase to be used for authentication may be extracted in real time, but not necessarily. The phrase may be resolved and tagged to the interaction in real time for future batch mode enrollment. In other embodiments, voice prints may be created as part of an ongoing back end process, e.g., offline, in which voice prints for existing customers are created from historic recordings in preparation for their next communication session. In that case, there may be no ongoing communication session and all that is needed to commence the process is a customer ID. In that case, the first operation may be to select a customer ID.

Once a communication session has been associated with a customer at operation 301, for example by real time client 141 in conjunction with connect module 125 and distributed cache 127, at operation 303 the ? supplies the identities of recorded communications sessions with that customer, for example to the speech analytics server 24. These identities may correspond to a selection of all of that customer's sessions, for example based on predetermined criteria such as a time frame. The identities are used to retrieve some or all of the audio recordings of speech by the individual at operation 305. The recordings may be in the form of audio files, corresponding to those communications sessions. The recordings may be in digital or analogue form.

At operation 307, a search is made through the one or more recordings of speech for utterances of the predetermined phrase. The aim of this operation is to find at least a predetermined number of utterances, for example at least three. At operation 309, each utterance of the predetermined phrase that was found in operation 307 is located, in other words its location within the recording is marked. After operation 205 and prior to operation 307, the audio files may be subject to a key phrase extraction process described with reference to FIG. 4, to facilitate the searching for utterances of the predetermined phrase.

Operations 307 may end either when all of the retrieved recordings have been searched or when the predetermined number of utterances has been found. Operations 307 and 309 may for example be performed by speech analytics server 24. Operations 305 and 307 may be combined. The speech analytics server 24 may run a phonetics based search to detect the position in the audio files of the predetermined phrase, and then use any of phonetics, natural language processing (NLP) and other algorithms to check that a found phrase matches the predetermined phrase. According to some embodiments of the invention, the recorded speech may be converted from speech to text in order to ascertain whether the predetermined phrase was uttered.

Some embodiments of the invention include the making of the speech recordings, for example by audio server 16, in which metadata is used to mark one or both of the start and end of each of one or more predetermined phrases. For example, a start event may be marked when an agent asks a customer for his account number and an end event may be marked when the customer has finished speaking in response. Thus, the operation of searching according to some embodiments of the invention may include using metadata indicating the start of an utterance to locate an utterance in the recording.

At operation 311, it is determined whether at least a predetermined number, e.g., three, of utterances of the predetermined phrase have been found. This operation may be performed using an algorithm operating in the speech analytics server. If not, the process is exited and a report is made at operation 313, for example from speech analytics server to enrolment unit 122, that the attempt to create a voice print was unsuccessful. The report may be used to ensure that a repeat attempt to create a voice print is not made until more voice recordings associated with that customer ID are available. Operations 311 and 313 may be performed by speech analytics server 24.

At operation 315, an audio file is created for each of at least the predetermined number of the utterances of the predetermined phrase. This operation may be performed by the speech analytics server 24. At operation 317, the audio file or files created in operation 315 are used to generate a voice print. The generation of the voice print may be performed by the voice biometric server 22, for example at the request of the management server 12. The audio files created at operation 315 may contain less audio information than the recordings from which they are extracted or copied and may therefore simplify the generation of the voice print. For example, each audio file created at operation 315 may contain no audio information other than predetermined phrase. The audio files may be created at operation 315 by cropping the audio retrieved at operation 305. However, it will be appreciated that it is possible for the voice print to be generated from the audio files without cropping.

The voice print may be stored in association with the customer ID, for example in binary form, ready to be used for authentication in the current interaction or a subsequent interaction with the customer. The voice print may be stored in operational data base 20. The voice print may be in the form of a biometric analysis of the audio files for comparison to a new utterance of the phrase in a new interaction. The corresponding words in text form may also be stored, for example in operational database 20, in association with the customer ID.

Figure 4:
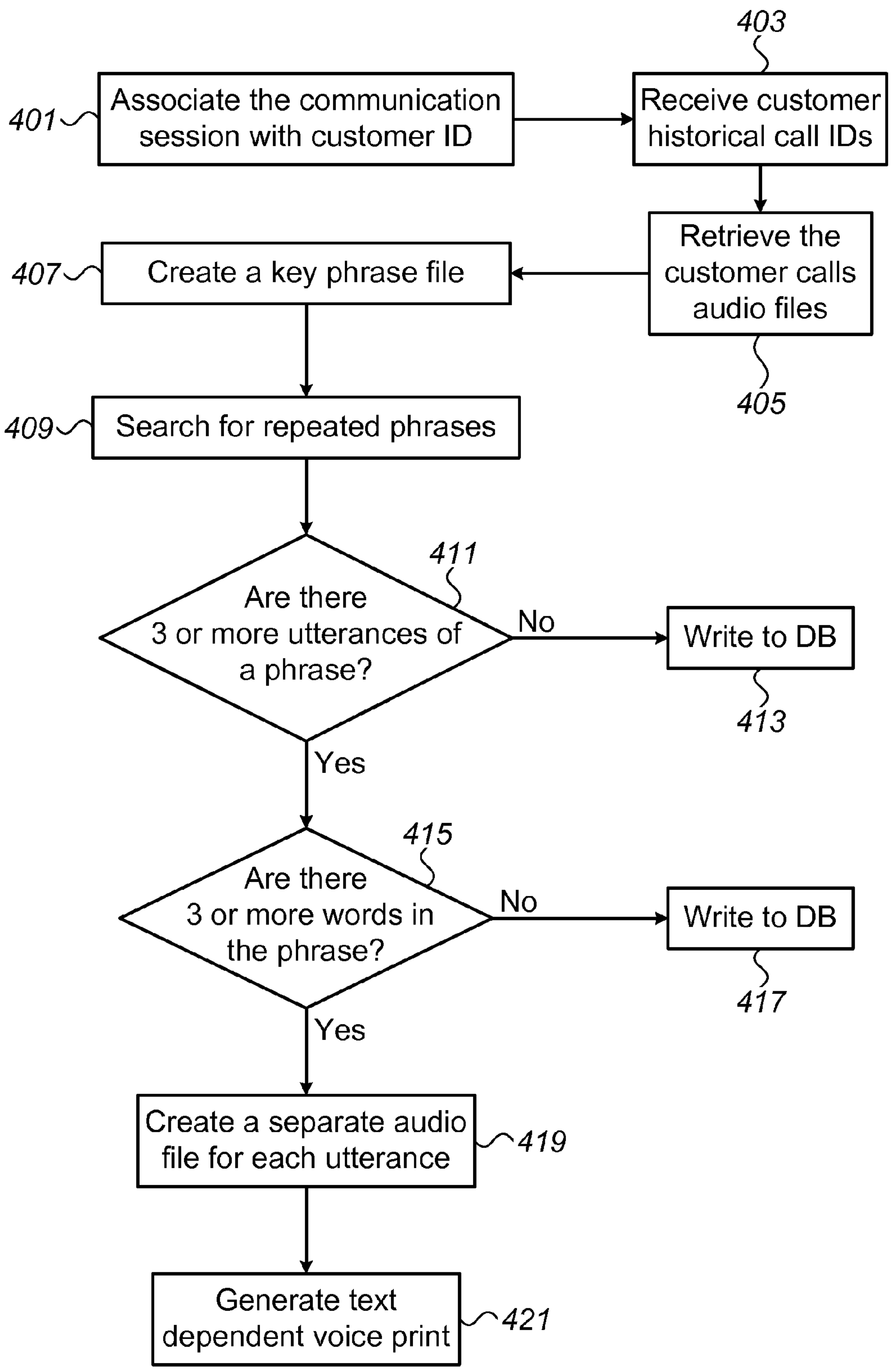
FIG. 4 is a flow chart of operations in a search for repeated utterances of phrases that are not predetermined in recordings of speech according to embodiments of the invention.

FIG. 4 shows an alternative flow that may be used to generate a voice print when it has not been predetermined what phrase should be used to enroll an individual.

Operations 401 and 403 may be the same as operations 301 and 303. The speech recordings, e.g., audio files, retrieved at operation 405 are then subject to processing in operation 407 to locate one or more key phrases spoken by the individual. In this case, rather than searching for a particular phrase, the aim is to detect any phrase that is repeated in the recording. This may be achieved by the speech analytics server 24, for example implementing a key phrase detection algorithm. Suitable key phrase extraction algorithms are known in the art and examples are disclosed for example in U.S. Pat. No. 8,762,161, the content of which is incorporated herein by reference. A key phrase extraction algorithm may use one or more of speech to text conversion, NLP and other algorithms, to extract or copy one or more key phrases from a speech recording. Thus, in either operation 307 or operation 407, at least part of one or more recordings being searched may be converted from speech to text.

A key phrase file may be created at operation 407. Here, extracted key phrases may be used to create a file, for example in XML format, containing the key phrase, and optionally including metadata relating to the phrase such as position (e.g., within overall interaction/conversation); type, e.g., verb, adjective etc.; and duration.

At operation 409, a search is made through some or all of the files retrieved at operation 405 to find phrases, e.g., phrases determined to be key phrases in operation 407, that are repeated either in one file or across multiple files.

At operation 411, it is determined whether any phrase is uttered at least a predetermined number, e.g., three, times. If no, this is reported as a failed enrolment attempt at operation 413, similar to operation 313. If yes, then at operation 415 any phrase that is uttered at least the predetermined number of times is examined to determine whether it contains at least a predetermined number of words, e.g., three words. Alternatively, operation 415 may determine whether a repeated phrase contains at least a predetermined number of syllables. The predetermined number of words or syllables is chosen based on experience of what is the minimum number of words or syllables needed to generate a reliable voice print, and may for example depend on the intended use of the voice print and/or level of security required.

If more than one key phrase is uttered at least the predetermined number of times, operation 415 may be performed more than once. For example, if a first phrase examined at operation 415 contains fewer than three words, another phrase may examined to determine whether that contains fewer than three words. If no phrase that is uttered at least the predetermined number of times is found to contain at least the predetermined number of words or syllables, this is reported at operation 417 as a failed enrolment attempt, similar to operation 413. Following any of operations 313, 413 and 417, the process is exited.

If a phrase is found that is uttered at least the predetermined number of times and contains at least a predetermined number of words or syllables, then at operation 419, similar to operation 315, a separate file is created for each utterance and at operation 421 a voice print is generated in a similar manner to operation 317.

The voice print may be stored, for example in operational database 20, in association with the customer ID in the same way as a voice print based on a predetermined phrase.

A search for an utterance of a phrase according to some embodiments of the invention will now be described with reference to FIG. 5. According to some embodiments of the invention, the creation of a text dependent voice print may require as input a predetermined minimum, for example three, utterances of a phrase with a predetermined number, for example three to four, words or syllables from the same speaker. The utterances may be from the same call or from multiple calls. The phrase may be predetermined or not.

Figure 5:
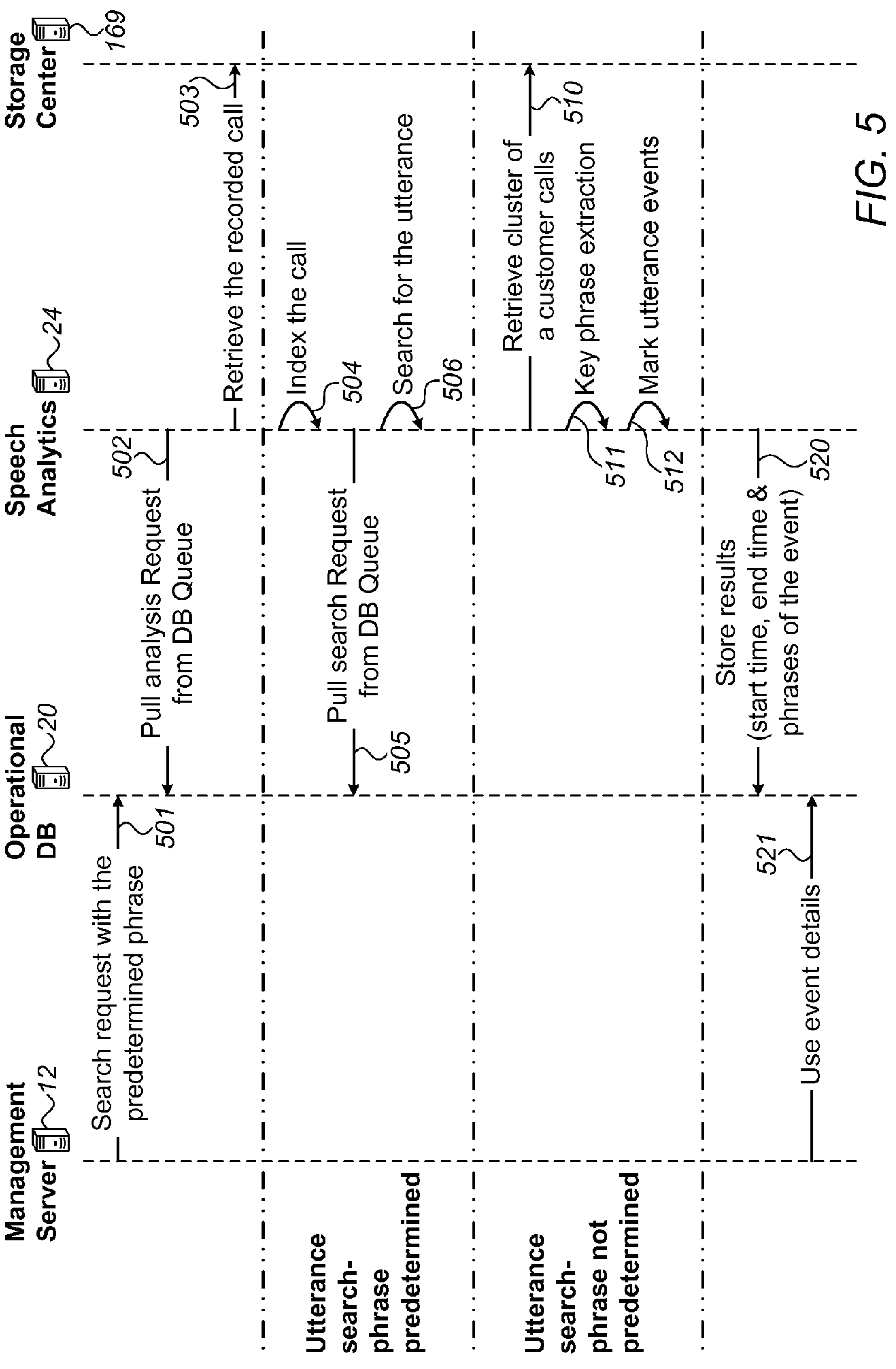
FIG. 5 is a sequence diagram for the location of an utterance of a phrase for use in generation of a voice print according to embodiments of the invention.

The upper part of FIG. 5 shows a sequence diagram for finding utterances of a predetermined phrase for use in generating a voice print, corresponding to some of the operations of FIG. 3. The lower part of FIG. 5 shows a sequence diagram for finding utterances of a phrase that is not predetermined, for use in generating a voice print, corresponding to some of the operations of FIG. 4.

Both types of utterance search may begin with a request or call 501, for example from the management server 12 to the operational database 20, for the search to be carried out. In the case of a predetermined phrase, the call may include the phrase to be searched for.

The operational database 20 may have a queue of requests for the speech analytics server 24 and at 502 the speech analytics server may send a request to the operational database 20 to pull an analysis request to be performed. At 503, based on an analysis request, the speech analytics server 24 requests one or more recordings of speech to be retrieved from the storage center 169. Operations 501, 502 and 503 may be common to searches for utterances or predetermined phrases or phrases that are not predetermined Operations 501, 502 and 503 may be batch operations in which case for example multiple recorded calls may be retrieved at operation 503. However, analysis of recordings may be carried out on a call by call basis.

A search for an utterance of a predetermined phrase may search for known words or phrases. To take the example of a recording of a call, following retrieval, a call may first be indexed as indicated at 504 by the speech analytics server 24. This indexing may for example be based on phonetics, or speech to text conversion or a combination of these two technologies. The speech analytics server may then pull a search request from a queue at the operational database 20, as indicated at 505, and perform the request for an utterance of the predetermined phrase as indicated at 506. The separation of the analysis and search requests is not essential but permits asynchronous operation. In this configuration, the database 20 acts as a pull of commands from the speech analytics server 24 and the management server is the one that "puts" the commands in the queue. According to other embodiments of the invention, this indexing of a call or of a recording may be done at an earlier stage, for example when the recording is initially generated. Thus, some embodiments of the invention include the making of the recording and the indexing, for example to indicate the start or end or both of known phrases.

Referring now to the lower part of FIG. 5, a search performed according to some embodiments of the invention may begin with no preliminary knowledge of phrases to be searched for. An algorithm operating in speech analytics server may look for words or phrases or both using phonetics, or text based searching, or any other method of speech analysis.

A search of this kind may begin with the retrieval of a cluster or batch of calls or other speech recordings of a particular customer, as indicated at 510. This may be in response to a query for a set of calls of a specific customer that uses interactions metadata associate with the recordings. This will form a set of calls that speech analytics server 24 is to work on. It should be noted here that searching for a specific or predetermined phrase may be done on a call by call basis, whereas according to some embodiments of the invention a search for an "unknown" or not pre-determined phrase may be performed on a set of calls.

The recordings are analyzed as indicated at 511 to find unique and repeated words and phrases and these may be identified in all of the recordings.

At 512, repeated utterances may be marked at the end of the analysis. For example, the start and stop time may be marked as events in the interaction, to be used in a passive enrollment process according to embodiments of the invention.

For both kinds of searches based on predetermined or not predetermined phrases, at 520 the identified phrases and their start and stop time are stored in the operational database 20.

At 521, an enrollment process is requested by management server 12 to operational database 20. Events marked in operation 512 may be used in the enrollment. The phrases and their location in the call may be used in the enrollment process. The enrollment process may include the generation of audio files for the specific utterances of the phrases and the use of these to generate a voice print as described with reference to FIG. 3 and FIG. 4.

Figure 6:
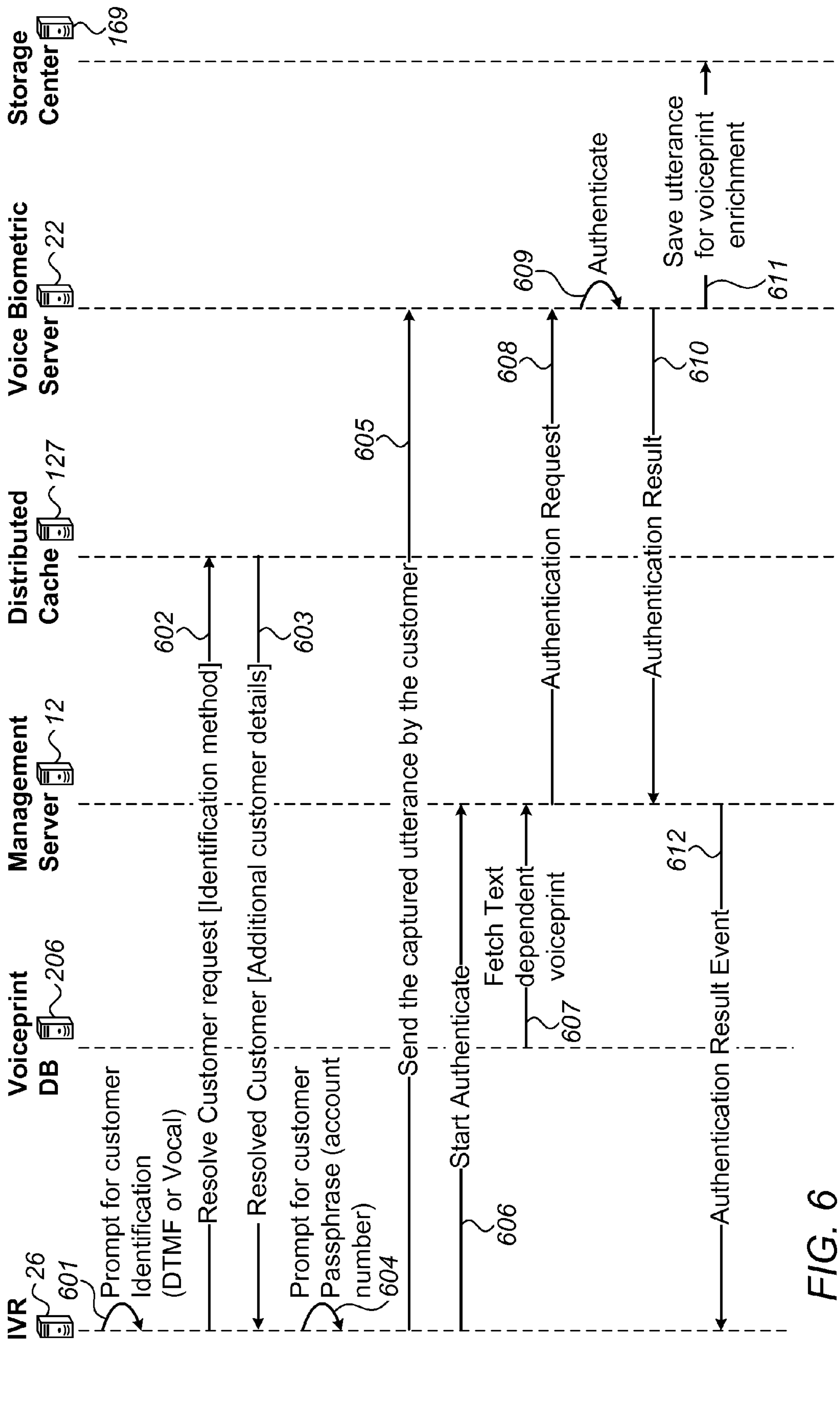
FIG. 6 is a sequence diagram for the authentication of an individual according to embodiments of the invention.

FIG. 6 shows a sequence diagram of a flow of customer authentication using an automated text dependent voice print, according to embodiments of the invention, using an example of a "self service" transaction, such as might be conducted using IVR 26.

At 601, the IVR prompts a customer to identify him/herself. In this embodiment, the customer is required to claim his/her identity to start the self-service transaction. The claimed identity may be associated with an internal customer identifier to which the voiceprint is attached. A customer may identify himself by one or more of name, account number, date of birth and other data. The IVR 26 may specify which one of these the customer is required to use and this may be input by the customer speaking or using another input device such as a keypad or touch screen.

At 602, a "resolve customer" request is sent from the IVR 26 to the distributed cache 127 to pull out an internal customer identifier, for example corresponding to the spoken or otherwise input customer identifier, to which the voiceprint is attached.

At 603, the customer is resolved, for example distributed cache 127 responds back to IVR 26 with the customer ID, e.g. an internal customer identifier, and additional details about the customer, such as last successful authentication date and time.

According to some embodiments of the invention, an individual may be prompted to utter the phrase during an interaction, the phrase being the phrase that was previously used to generate the voice print and is now to be used as a pass phrase. In the embodiment illustrated in FIG. 6, at 604, the customer is prompted for the phrase. For example, IVR 26 may ask the customer to utter a phrase, such as account number, date of birth or another phrase that has been used to generate the voice print. The utterance of the pass phrase by the customer may be captured by the IVR 26.

At operation 605, the utterance of the pass phrase that was captured by the IVR 26 is sent by the IVR 26 to the real time authentication engine 124. This may be in the form of a voice file, buffer or stream. At operation 606, a request or command is sent from the IVR 26 to the management server 12 to start the authentication process. At operation 607, the management server 12 fetches the customer's text dependent voiceprint from the voiceprints database repository 206. At operation 608, the management server 12 sends a request to start the authentication to the voice biometric server 22. At operation 609, the authentication process is carried out by the voice biometric server for example running one or more biometrics algorithms to match the stored voiceprint to the utterance spoken in response to prompt 604. It should be noted that the match here is not a simple word match but rather a match based on the biometric analysis of the new utterance and the utterances that were used to create the voice print.

Techniques for authentication using voice prints are known in the art and will not be described further herein. The authentication may simply be regarded as checking similarity between the new utterance and the voice print. It may involve converting the new utterance into a format suitable for comparison with the voice print, such as for example by performing frequency or other analysis on the new utterance. One suitable technique can be summarized as processing the new utterance for comparison with the stored voice print, comparing the processed utterance with the stored voice print, and authenticating the originator of the new utterance if the result of the comparison meets certain predetermined criteria.

At operation 610, the authentication result, which may for example be simply positive or negative, e.g., in binary form, may be reported back from the voice biometric server 22 to the management server 12.

If the authentication result was negative, the result might be stored and reported according to some embodiments of the invention as a possible instance of fraud. Such storage might be at storage center 169 and might be in association with other information relating to the customer whose identity and passcode was given, e.g., spoken, as part of the interaction. If the authentication result was positive, the utterance may be saved at operation 611, again for example at storage center 169 in association with other information relating to the customer. The utterance that led to the positive authentication may be used to enrich the voice print already stored at storage center 169. This enrichment may help to reduce the rate of false rejections or unsuccessful authentications from genuine authentication attempts. It may also help to ensure that the voice print is current which may be useful since the voice of an individual may change over time.

The last operation shown in FIG. 6 is the passing of the authentication result from the management server 12 to the IVR 26 so that the interaction may continue. It will be appreciated that this may take place in parallel with or before operation 611. If the customer was successfully authenticated then the IVR may for example continue to a self-service menu.

Figure 7:
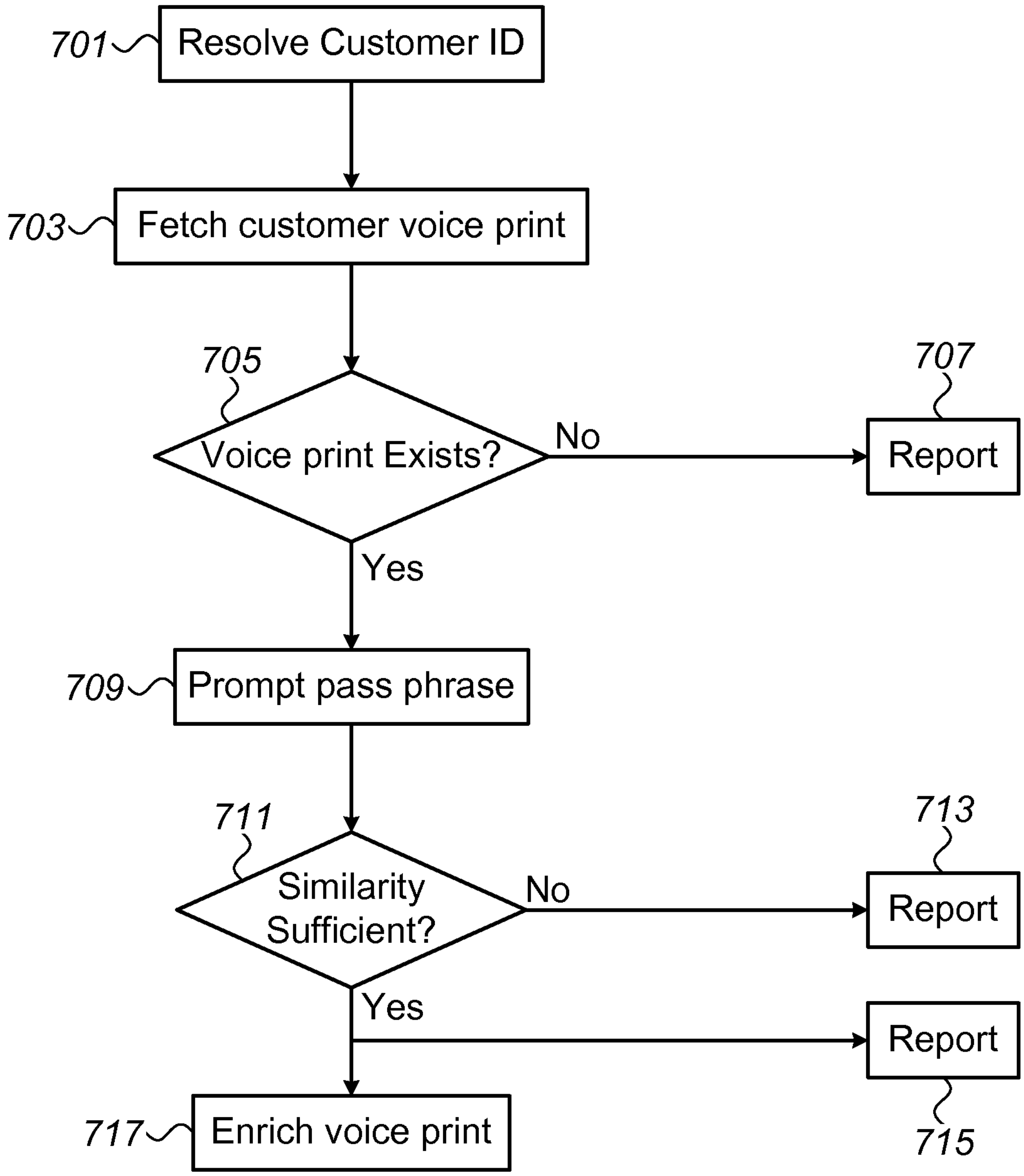
FIG. 7 is a flow chart showing the authentication of an individual according to embodiments of the invention.

A method of authentication of an individual according to embodiments of the invention is illustrated in FIG. 7 in the form of a flow chart. The operations shown in FIG. 7 may all be performed by management server 12 incorporating real time authentication engine 124.

The first operation 701 shown in FIG. 7 is the resolution of customer ID, for example in response to receiving a first indication of who the customer is in response to operation 601 at the IVR 26. The customer may be resolved by fetching the ANI or other unique identifier for that customer or individual. This unique identifier may be used to link the customer ID given by the customer during the interaction to the voice print. Once the customer has been resolved, an attempt is made at operation 703 to fetch or retrieve a voice print for the individual, for example from voice print database 206, which may have been stored in association with the customer unique identifier. Thus the retrieval may be based on customer ID.

According to some embodiments of the invention, for example where all customers are enrolled using a voice print, the voice print itself, or the text equivalent, may serve as the customer unique identifier, so that separate operations 701 and 703 are not required. However, according to other embodiments, the separate operations may be required, for example for increased security.

A voice print may not exist for all individuals. For example the system may not yet have sufficient recordings of the voice of the individual to create a voice print, or the voice print may not yet have been generated. A check is made at operation 1305 as to whether a voice print for the individual who has provided some identification information as to whether a voice print exists, e.g., is stored in association with the individual's identification information. If no voice print exists, for example no voice print is stored in the storage center 169, this fact is reported to operational database 20 at operation 707 and the process ends. The report at operation 707 may be used to add the individual to a list of candidates for future enrollment by voice print.

If a voice print does exist for the individual, for example a voice print is successfully fetched from storage center 169, then at operation 709 the individual is prompted to speak the pass phrase. For this purpose, the pass phrase may be stored in text form and presented to a user of user device who then asks the customer to repeat or utter the pass phrase. It should be noted here that, according to some embodiments of the invention, the pass phrase may differ from one individual to another and, therefore, the request to repeat the pass phrase may be specific to the individual. The utterance of the pass phrase is captured in audio form, for example by the IVR 26 or RT client 142, and may be returned to and received by the management server 12 from where it is passed to the voice biometric server 22 where it may be processed by a voice biometrics engine operating on processor 222. Voice biometrics engines are known in the art and operate to measure the characteristics of a human voice in order to generate a voice print. The new utterance of the pass phrase may be used in a similarity check and at operation 711 it is determined whether the similarity between the new utterance and the voice print is sufficient, for example meets predetermined criteria. Suitable criteria are known in the art. For example, the new utterance and the voice print may be compared or otherwise processed to determine a biometrics match score, and an individual may be authenticated only if the biometrics match score exceeds a predetermined threshold.

It should be noted here that an individual may be rejected prior to the similarity check at operation 711 if the spoken pass phrase does not match the text equivalent. This may be done by user, for example using user interface 144, or automatically by IVR 26.

If it is determined at operation 711 that the similarity between the new utterance and the voice print is not sufficient, for example the biometrics match score is equal to or less than the threshold, the individual is not authenticated and this authentication failure is reported at operation 713. This might be used to report a possible fraud for example. A log may be compiled of failed authentication attempts and optionally the reasons for failure.

If it is determined at operation 711 that the similarity is sufficient, the success is reported at operation 715, and the individual is authenticated. In addition, at operation 717, the utterance of the pass phrase is used to enrich the voice print at operation 717. This enrichment may for example comprise adding the customer audio from the last, e.g., just occurred, authentication flow to the voice print already stored at voice print database 206.

Below is an example of data elements that may be used to detect a key phrase in speech by an individual:

```
<AnalyticsDocument>
  <Subject>
    <Key>
      <Type>Audio</Type>
      <InteractionId>261</InteractionId>
      <SiteId>1</SiteId>
```

-continued

```
      <Side>Customer</Side>
      <Language>EnglishUS</Language>
    </Key>
    <FilePath>D:\Program Files\NICE Systems\Nice Content Analysis
  Server\ MediaCache\Seg_261_Site_1_7-21-2011 11-02-22 AM_U.wav</FilePath>
    <NoParticipants>2</NoParticipants>
    <Duration>485663</Duration>
    <HoldsList />
  </Subject>
  <Engines>
    <STT id=“0”>
      <Events>
        <Event id=“0” start=“10380” end=“10659” certainty=“100”>eleven</Event>
        <Event id=“1” start=“10659” end=“10989” certainty=“100”>october</Event>
        <Event id=“2” start=“10989” end=“11119” certainty=“100”>ninty</Event>
        <Event id=“3” start=“11119” end=“11480” certainty=“100”>seventy</Event>
        <Event id=“4” start=“11480” end=“12110” certainty=“100”>five</Event>
      </Events>
    </STT>
    <NLP id=“1”>
      <Events>
        <Event id=“0” pos=“Num” base=“eleven” />
        <Event id=“1” pos=“Noun” base=“october” />
        <Event id=“2” pos=“Num” base=“ninty” />
        <Event id=“3” pos=“Num” base=“seventy” />
        <Event id=“4” pos=“Num” base=“five” />
      </Events>
    </NLP>
    <KeyPhrases id=“2”>
      <Events>
        <Event id=“0” start=“10659” end=“11119” certainty=“1” pos=“NounVerb”
  combined=“30” startId=“1” endId=“2” importance=“30”>eleven october</Event>
        <Event id=“1” start=“12550” end=“13010” certainty=“1” pos=“Noun” combined=“58”
  startId=“7” endId=“8” importance=“58”>ninty seventy five</Event>
      </Events>
    </KeyPhrases>
  </Engines>
</AnalyticsDocument>
```

Different embodiments are disclosed herein. Features of certain embodiments may be combined with features of other embodiments; thus, certain embodiments may be combinations of features of multiple embodiments.

Some embodiments of the invention may include an article such as a computer or processor readable non-transitory storage medium, such as for example a memory, a disk drive, or a USB flash memory device encoding, including or storing instructions, e.g., computer-executable instructions, which when executed by a processor or controller, cause the processor or controller to carry out methods disclosed herein.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A computer implemented method of generating a text-dependent voice print for an individual by passive enrollment using a not predetermined repeated phrase to enroll the individual in a system, the method comprising:

receiving, based on identification information of the individual from an audio server, audio data of past communication sessions involving the individual:

searching, by a speech analytics server, the audio data of the past communication sessions that include speech by the individual for the not predetermined repeated phrase that is uttered more than at least three times;

when the not predetermined repeated phrase is uttered more than three times, locating at least a predetermined number of utterances of said not predetermined repeated phrase in the audio data of the past communication sessions, said predetermined number being more than three times and when not found, reporting by the speech analytics server to an enrollment unit that the enrollment of the individual has failed;

determining whether the repeated phrase contains more than three words and when not, reporting by the speech analytics to the enrollment unit that the enrollment of the individual has failed;

when the repeated phrase contains more than three words, creating a separate audio file for each utterance of the repeated phrase;

generating, by a voice biometric server, the text-dependent voice print for the individual based on the audio files containing located utterances of the repeated phrase; and storing the text-dependent voice print in association with the identification information of the individual.

2. The method of claim 1, wherein locating comprises using metadata to indicate the start of each of the utterances or the end of each of the utterances, or both.

3. The method of claim 1, wherein the repeated phrase is determined by searching one or more recordings of the audio data for any phrase that is uttered by the individual at least said predetermined number of times.

4. The method of claim 3, wherein only phrases having at least a predetermined number of words are used for generating the voice print, wherein the predetermined number is more than three times.

5. The method of claim 1, further comprising marking the audio data, using metadata to mark one or both of the start and end of an utterance of each of the repeated phrases, and storing the metadata in association with the audio data.

6. The method of claim 1, further comprising storing the voice print in association with other data related to the individual.

7. The method of claim 1, further comprising storing the repeated phrase in text form in association with other data related to the individual as a pass phrase for future authentication of the individual.

8. The method of claim 1, further comprising:

in a future communication session, receiving a new utterance of the repeated phrase by the individual; and authenticating the individual from the new utterance using the voice print for the individual.

9. The method of claim 8, wherein the new utterance of the repeated phrase is used to enrich the voice print for the individual previously generated from the utterances in the one or more stored audio files.

10. The method of claim 7, further comprising prompting the individual to utter the pass phrase for seamless authentication during an interaction between the individual and a third party.

11. The method of claim 1, wherein searching for the repeated phrase comprises converting at least part of the audio data to text.

12. A system for generating a text-dependent voice print for an individual by passive enrollment using an unknown phrase to enroll the individual in the system, the system comprising:

a speech analytics server configured to:

receive, based on identification information of the individual from an audio server, audio data of past communication sessions involving the individual;

search the audio data of the past communication sessions that include speech by the individual for at least one not predetermined repeated phrase that is uttered more than at least three times;

when a repeated phrase that is uttered more than three times is found, locate at least a predetermined number of utterances of said at least one repeated phrase in the audio data of the past communication sessions, said predetermined number being more than three times and when not found, report to an enrolment unit that the enrolment of the individual has failed;

determine whether the repeated phrase contains more than three words and when not, reporting by the speech analytics to the enrolment unit that the enrolment of the individual has failed;

when the repeated phrase contains more than three words, create a separate audio file for each utterance of the repeated phrase; and a voice biometric server configured to generate the text-dependent voice print for the individual by analyzing the audio files containing the utterances of the repeated phrase located by the speech analytics server.

13. The system of claim 12, wherein the voice biometric server is further configured to receive a new utterance of said repeated phrase and to use the voice print to determine whether the new utterance was uttered by the individual.

14. The system of claim 13, wherein the voice biometric server is further configured to enrich the voice print using a new utterance following a determination that the new utterance was by the individual.

15. The system of claim 13, wherein the speech analytics server is configured to convert the phrase to text to be stored in association with other information relating to the individual.

* * * * *